United States Patent
Ram et al.

(10) Patent No.: US 11,815,779 B2
(45) Date of Patent: Nov. 14, 2023

(54) SINGLE ACTIVE LAYER ELECTROCHROMIC DEVICES

(71) Applicant: University of South Florida, Tampa, FL (US)

(72) Inventors: Manoj Kumar Ram, Tampa, FL (US); Elias K. Stefanakos, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/838,443

(22) Filed: Jun. 13, 2022

(65) Prior Publication Data

US 2022/0308417 A1    Sep. 29, 2022

Related U.S. Application Data

(63) Continuation of application No. 16/608,501, filed as application No. PCT/US2018/032914 on May 16, 2018, now Pat. No. 11,360,366.

(60) Provisional application No. 62/507,359, filed on May 17, 2017.

(51) Int. Cl.
  *G02F 1/163*  (2006.01)
  *G02F 1/1516*  (2019.01)
  *C09K 9/02*  (2006.01)

(52) U.S. Cl.
  CPC ............ *G02F 1/15165* (2019.01); *C09K 9/02* (2013.01); *G02F 1/163* (2013.01)

(58) Field of Classification Search
  CPC ...................................................... G02F 1/163
  See application file for complete search history.

(56) References Cited

U.S. PATENT DOCUMENTS

| | | |
|---|---|---|
| 5,812,300 A | 9/1998 | Coleman |
| 5,888,431 A | 3/1999 | Tonar |
| 5,995,273 A | 11/1999 | Chandrasekhar |
| 6,193,912 B1 * | 2/2001 | Thieste ................ G02F 1/1503 359/275 |
| 6,791,738 B2 | 9/2004 | Reynolds et al. |
| 6,928,572 B2 | 8/2005 | Fletcher et al. |
| 7,054,050 B2 | 5/2006 | Vincent et al. |
| 7,125,479 B2 | 10/2006 | Sotzing |

(Continued)

FOREIGN PATENT DOCUMENTS

JP        07207260 A       8/1995

OTHER PUBLICATIONS

Pei et al., Electrochromic and highly stable poly(3,4-ethylenedioxythiophene) switches between opaque blue-black and transparent sky blue (Year: 1994).*

(Continued)

*Primary Examiner* — Charlie Y Peng
(74) *Attorney, Agent, or Firm* — QUARLES & BRADY LLP; Yakov Sidorin

(57) ABSTRACT

In one embodiment, an electrochromic device includes a single active layer configured to be alternately placed in a light-transmitting state in which relatively large amounts of light can be transmitted through the active layer and a light-blocking state in which relatively small amounts of light can be transmitted through the active layer, wherein the device comprises no other layers of material that contribute to transitioning between the two states.

19 Claims, 10 Drawing Sheets

(56) References Cited

U.S. PATENT DOCUMENTS

| | | | |
|---|---|---|---|
| 7,586,663 B1* | 9/2009 | Radmard | G02F 1/15165 |
| | | | 345/105 |
| 7,602,543 B2 | 10/2009 | Kokeguchi | |
| 8,498,038 B2 | 7/2013 | Noh et al. | |
| 8,970,937 B2 | 3/2015 | Son et al. | |
| 9,201,253 B2 | 12/2015 | Satoh et al. | |
| 9,377,662 B2 | 6/2016 | Lee | |
| 9,405,165 B2 | 8/2016 | Eaton et al. | |
| 2002/0021481 A1* | 2/2002 | Lin | B60R 25/102 |
| | | | 359/275 |
| 2003/0087533 A1* | 5/2003 | Stupp | H01B 1/12 |
| | | | 438/745 |
| 2003/0174377 A1* | 9/2003 | Reynolds | C08G 61/124 |
| | | | 359/265 |
| 2005/0079386 A1 | 4/2005 | Brown et al. | |
| 2007/0153355 A1 | 7/2007 | Huang | |
| 2015/0234248 A1 | 8/2015 | Ram et al. | |
| 2016/0109776 A1 | 4/2016 | Ram et al. | |

OTHER PUBLICATIONS

M. Ram, S. Annapoorni, B. Malhotra, Electrical properties of metal/Langmuir-Blodgett layer/semiconductive devices, Journal of applied polymer science, 60 (1996) 407-411.

A. Azens, C. Granqvist, Electrochromic smart windows: energy efficiency and device aspects, Journal of Solid State Electrochemistry, 7 (2003) 64-68.

R .. Baetens, B.P. Jelle, A. Gustavsen, Properties, requirements and possibilities of smart windows for dynamic daylight and solar energy control in buildings: A state of-the-art review, Solar Energy Materials and Solar Cells, 94 (2010) 87-105.

P.M. Beaujuge, J.R. Reynolds, Color control in TT-conjugated organic polymers for use in electrochromic devices, Chemical reviews, 110 (2010) 268-320.

C.G. Granqvist, E. Avendano, A. Azens, Electrochromic coatings and devices: survey of some recent advances, Thin Solid Films, 442 (2003) 201-211.

C. Granqvist, Electrochromic devices, Journal of the European Ceramic Society, 25 (2005) 2907-2912.

Y.C. Kung, S.-H. Hsiao, Fluorescent and electrochromic polyamides with pyrenylamine chromophore, Journal of Materials Chemistry, 20 (2010) 5481-5492.

N.R. Lynam, Electrochromic automotive day/night mirrors, SAE Technical Paper, 1987.

M. Ram, R. Mehrotra, S. Pandey, B. Malhotra, AC conductivity of polyemeraldine base, Journal of Physics: Condensed Matter, 6 (1994) 8913.

S. Misra, M. Ram, S. Pandey, B. Malhorta, S. Chandra, Vacuum-deposited metal/polyaniline Schottky device, Applied physics letters, 61 (1992) 1219-1221.

Monk, R. Mortimer, D. Rosseinsky, Electrochromism and electrochromic devices, Cambridge University Press 2007.

R..J. Mortimer, Electrochromic materials, Annual review of materials research, 41 (2011) 241-268.

R..J. Mortimer, Electrochromic materials, Chemical Society Reviews, 26 (1997) 147-156.

S. Percec, S. Tilford, A single-layer approach to electrochromic materials, Journal of Polymer Science Part A: Polymer Chemistry, 49 (2011) 361-368.

M. Ram, N. Sundaresan, B. Malhotra, Langmuir-Blodgett films of processable polyaniline, The Journal of Physical Chemistry, 97 (1993) 11580-11582.

K. Ramanathan, M. Ram, B. Malhotra, A.S.N. Murthy, Application of polyaniline-Langmuir-Blodgett films as a glucose biosensor, Materials Science and Engineering: C, 3 (1995) 159-163.

N.M. Rowley, R.J. Mortimer, New electrochromic materials, Science progress, 85 (2002) 243-262.

M. Ram, N. Sundaresan, B. Malhotra, Performance of electrochromic cells of polyaniline in polymeric electrolytes,ournal of materials science letters, 13 (1994) 1490-1493.

C. Yan, W. Kang, J. Wang, M. Cui, X. Wang, Cy Foo, K.J. Chee, P.S. Lee, Stretchable and wearable electrochromic devices, ACS nano, 8 (2013) 316-322.

M.M. Ayad, A.A. El-Nasr Adsorption of cationic dye (methylene blue) from water using polyaniline nanotubes base, The Journal of Physical Chemistry C, 114 (2010) 14377-14383.

P.N. Bartlett, E. Simon, Poly (aniline} poly (acrylate) composite films as modified electrodes for the oxidation of NADH Physical Chemistry Chemical Physics, 2 {2000) 2599-2606.

S.-A. Chen, G.-W. Hwang, Structures and properties of the water-soluble self-acid-doped conducting polymer blends: sulfonic acid ring-substituted polyaniline/poly (vinyl alcohol) and poly (aniline-co-N-propanesulfonic acid aniline)/polyvinyl alcohol), Polymer, 38 (1997) 3333-3346.

S. Dhawan, D. Kumar, M. Ram, S. Chandra, D. Trivedi, Application of conducting polyaniline as sensor material for ammonia, Sensors and Actuators B: chemical, 40 (1997) 99-103.

P. Dutta, S. Biswas, M. Ghosh, S. De, S. Chatterjee, The de and ac conductivity of polyaniline-polyvinyl alcohol blends, Synthetic metals, 122 (2001) 455-461.

Y. Geng, Z. Sun, J. Li, X. Jing, X. Wang, F. Wang, Water soluble polyaniline and its blend films prepared by aqueous solution casting, Polymer, 40 (1999) 5723-5727.

H.Gomez, M.K. Ram, F. Alvi, P. Villalba, E.L. Stefanakos, A. Kumar, Graphene-conducting polymer nanocomposite as novel electrode for supercapacitors, Journal of Power Sources, 196 (2011) 4102-4108.

M. Ram, R. Gowri, B. Malhotra, Electrical properties of metal/Langmuir-Blodgett (polymeraldine base) layer/metal devices, Journal of applied polymer science, 63 (1997) 141-145.

N. Kannan, M.M. Sundaram, Kinetics and mechanism of removal of methylene blue by adsorption on various carbons—a comparative study, Dyes and pigments, 51 (2001) 25-40.

N. Leventis, Y.C. Chung, Polyaniline-prussian blue novel composite material for electrochromic applications, Journal of the Electrochemical Society, 137 (1990) 3321-3322.

V.K. Garg, M. Arnita, R. Kumar, R. Gupta, Basic dye (methylene blue) removal from simulated wastewater by adsorption using Indian Rosewood sawdust: a timber industry waste, Dyes and pigments, 63 (2004) 243-250.

J. Qiao, T. Hamaya, T. Okada, New highly proton-conducting membrane poly (vinylpyrrolidone)(PVP) modified poly vinyl alcohol)/2-acrylamido-2-methyl-1-propanesulfonic acid (PVA-PAMPS) for low temperature direct methanol fuel cells (DMFCs), Polymer, 46 (2005) 10809-10816.

M. Ram, S. Annapoorni, S. Pandey, B. Malhotra, Dielectric relaxation in thin conducting polyaniline films, Polymer, 39 (1998) 3399-3404.

S.J. Su, N. Kuramoto, Synthesis of processable polyaniline complexed with anionic surfactant and its conducting blends in aqueous and organic system, Synthetic metals, 108 (2000) 121-126.

B. Yan, Z. Chen, L. Cai, Z. Chen, J. Fu, Q. Xu, Fabrication of polyaniline hydrogel: synthesis, characterization and adsorption of methylene blue, Applied Surface Science, 356 (2015) 39-47.

F.B. Silva, S.N. Vieira, L.R. Goulart, J.F. Boodts, A.G. Brito-Madurro, J.M. Madurro, Electrochemical i nvestigation of bligonucleotide-DNA hybridization on poly (4-methoxyphenethylamine), International journal of molecular sciences, 9 (2008) 1173-1187.

International Search Report for PCT/US2018/032914 dated Aug. 2, 2018.

* cited by examiner

SINGLE ACTIVE LAYER ELECTROCHROMIC DEVICES

CROSS-REFERENCE TO RELATED APPLICATIONS

This application is a continuation from the U.S. patent application Ser. No. 16/608,501 filed on Oct. 25, 2019 and now published as US 2020/0192174, which is a US national phase from the International Patent Application No. PCT/US2018/032914 filed on May 16, 2018 and now published as WO 2018/213411, which in turn claims priority from the U.S. Provisional Application No. 62/507,359, filed May 17, 2017. The disclosure of each of the above-identified documents is incorporated by reference herein. 2020/0192174

RELATED ART

Electrochromic devices are devices the optical properties of which—such as light transmission and absorption, for example—can be altered in a reversible manner through the application of a voltage. This property enables electrochromic devices to be used in various applications, such as smart windows, electrochromic mirrors, and electrochromic display devices.

Most commercially available electrochromic devices are relatively complex devices that comprise multiple layers of different materials that are required for the device to change state. As an example, some electrochromic devices comprise a layer of conductive glass, a layer of a metal oxide, an electrochromic layer, an ionic electrolyte layer, and a further layer of conductive glass. When an electrical potential is applied to such a device, an electrochemical reaction occurs at the interface of the two active layers (i.e., the electrochromic layer and the electrolyte layer), which changes the redox state of a polymer contained in the electrochromic layer, thereby changing the color of the electrochromic layer. In addition to their complexity, such devices can require expensive processes, materials, or equipment to manufacture. In view of this, it would be desirable to have simpler electrochromic devices that are less expensive to manufacture.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As mentioned above, it would be desirable to have electrochromic devices that are relatively simple in construction and that are relatively inexpensive to manufacture. Disclosed herein are examples of such devices. The electrochromic devices comprise a single active layer that can be transitioned from a light-transmitting state, in which a relatively large amount of light can be transmitted through the device, to a light-blocking state, in which a relatively small amount of light can be transmitted through the device, by controlling the electrical potential applied across the active layer. For example, the light-blocking state can be achieved when an electrical potential is applied to the active layer and the light-transmitting state can be achieved by reversing the electrical potential. In some embodiments, the active layer comprises a base polymer that includes an acid and an oxidant as well as a conducting polymer, a dye, or both. The active layer can be sandwiched between opposed transparent or translucent layers of material, such as glass, that protect the active layer and form a complete electrochromic "window."

In the following disclosure, various specific embodiments are described. It is to be understood that those embodiments are example implementations of the disclosed inventions and that alternative embodiments are possible. All such embodiments are intended to fall within the scope of this disclosure.

Figure 1A:
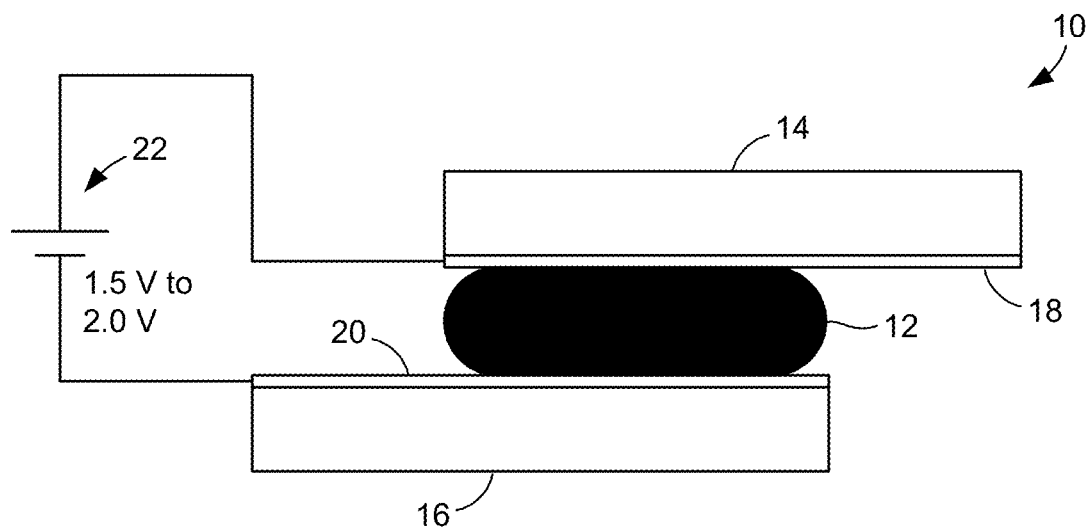
FIGS. 1A and 1B are schematic views of an embodiment of an electrochromic device showing the device in a light-blocking state and a light-transmitting state, respectively.
Figure 1B:
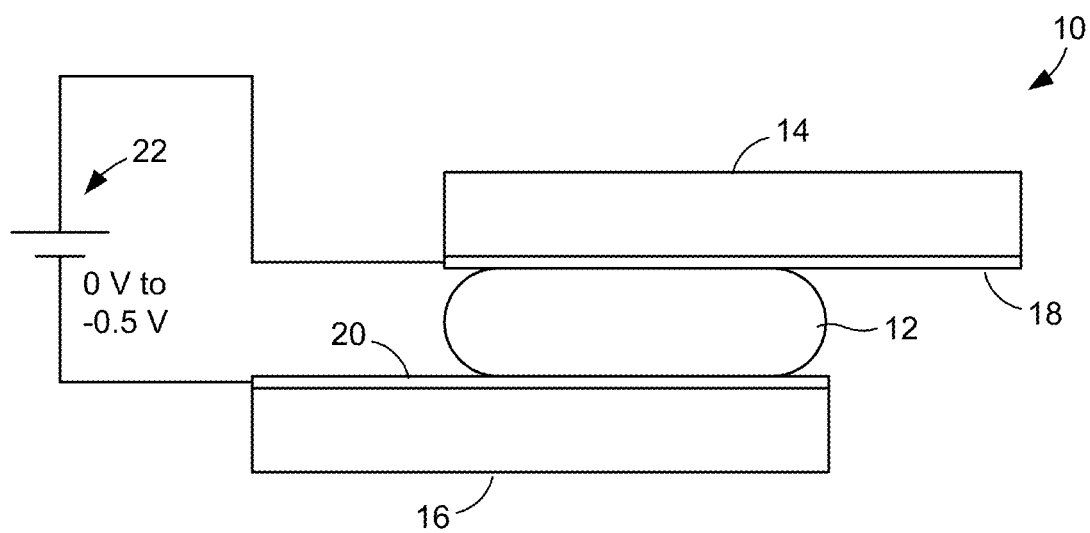

FIGS. 1A and 1B illustrate an example electrochromic device 10 in accordance with this disclosure. It is noted that the electrochromic devices disclosed herein, including the device 10, can be used as is or can be incorporated into other objects. For example, the disclosed electrochromic devices can be used as or incorporated into windows that can be alternately placed in a first state in which they block or absorb light and a second state in which they freely transmit light, depending on the desired effect.

As used herein, phrases such as "blocking" or "absorbing" light, or "reducing" or "limiting" the amount of light that can pass are not intended to be limited to situations in which no light can pass through the electrochromic device. Accordingly, when an electrochromic device is described herein as blocking, absorbing, reducing, limiting, etc. light or light transmission, the device may still enable some light to pass. In similar manner, phrases such as "transmitting" light or "enabling" light to pass are not intended to be limited to situations in which all light can pass through the electrochromic device without any light being blocked or absorbed. Accordingly, an electrochromic device that transmits light, enables light to pass, etc. may block or absorb some light and does not necessarily need to be completely transparent. Generally speaking then, the electrochromic devices disclosed herein can be described as having a first state in which relatively low amounts of light can pass and a second state in which relatively high amounts of light can pass.

With reference to FIGS. 1A and 1B, the electrochromic device 10 generally comprises a single active layer of material, or "active layer," 12 that is positioned (e.g., sandwiched) between first and second transparent or translucent layers of material, or "layers," 14 and 16. The active layer 12 is considered to be "active" because it is required to obtain a change in state. This is in contrast to the transparent or translucent layers 14, 16 that are not required to obtain the state change (and therefore are not active layers) but are instead provided to protect the active layer 12 and form a complete electrochromic window. Accordingly, there are no layers of the device 10 other than the single active layer 12 that contribute to the state change of the device.

In some embodiments, the layers 14, 16 comprise thin transparent glass or plastic plates that are coated with a transparent, electrically conductive film 18, 20 that facilitates the application of electrical potentials to the active layer 12. The transparent, electrically conductive films 18, 20 can, in some embodiments, comprise a transparent conducting oxide (TCO), such as indium tin oxide (ITO), fluorine doped tin oxide (FTO), or doped zinc oxide (ZnO). Irrespective of the composition of the transparent, electrically conductive films 18, 20, the films at least cover the surfaces of the layers 14, 16 that face the active layer 12.

The active layer 12 comprises one or more base polymers that form a conducting matrix. In some embodiments, the base polymer comprises one or more water-soluble, synthetic polymers. Example water-soluble, synthetic polymers include polyvinyl alcohol (PVA), poly (vinyl acetate), poly (vinyl alcohol co-vinyl acetate), polyvinyl acetate-vinyl alcohol, poly (methyl methacrylate, poly (vinyl alcohol-co-ethylene ethylene), poly (vinyl butyral-co-vinyl alcohol-co-vinyl acetate), poly(vinyl alcohol)-acrylamide, polyvinyl butyral, polyvinyl chloride, poly(vinyl nitrate), substituted (butyryl, palmitic, capryloyl, lauric, myristic, and stearic acids, myristol, halogens, azide, or amines, poly(vinyl alcohol), carboxylated poly(vinyl alcohol), poly(vinyl chloride-co-vinyl acetate-co-vinyl alcohol), poly(vinyl acetate-co-acrylic acid), poly(vinyl alcohol-co-acrylic acid), poly(vinyl alcohol)-acrylamide, poly(vinyl alcohol)-salicylic acid, poly (vinyl methyl ketone), polyacrylamides, polyamines, polyvinylpyrrolidone, and mixtures thereof.

The base polymer is mixed with one or more acids to form an electrolytic composition. Example acids include glacial acetic acid ($CH_3COOH$), propionic acid ($C_3H_6O_2$), hydrochloric acid (HCl), hydrofluoric acid (HF), phosphoric acid ($H_3PO_4$), acetic acid (non-glacial) ($CH_3COOH$), sulfuric acid ($H_2SO_4$), formic acid ($CH_2O_2$), benzoic acid ($C_7H_6O_2$), nitric acid ($HNO_3$), phosphoric acid ($H_3PO_4$), sulfuric acid ($H_2SO_4$), tungstosilicic acid hydrate ($H_4[Si(W_3O_{10})_4] \cdot xH_2O$), hydriodic acid (HI), carboxylic acids ($C_nH_{2n+1}COOH$), dicarboxylic acid ($HO_2C-R-CO_2H$), tricarboxylic acid ($C_6H_8O_6$), oxalic acid ($C_2H_2O_4$), hexacarboxylic acid ($C_{12}H_6O_{12}$), citric acid ($C_6H_8O_7$), tartaric acid ($C_4H_6O_6$), and mixtures thereof.

The base polymer is also mixed with one or more oxidants to enable the active layer 12 to be placed in an oxidized state. Example oxidants include aluminum nitrate ($Al(NO_3)_3$), ammonium dichromate (($NH_4)_2Cr_2O_7$), ammonium perdisulphate (APS) (($NH_4)_2S_2O_8$), barium nitrate ($Ba(NO_3)_2$), bismuth nitrate ($Bi(NO_3)_3 \cdot 5H_2O$), calcium hypoperchlorate ($Ca(ClO_2)_2$), copper (II) nitrate ($Cu(NO_3)_2$), cupric nitrate ($Cu(NO_3)_2$), ferric nitrate ($Fe(NO_3)_3$), hydrogen peroxide ($H_2O_2$), lithium hydroxide monohydrate (LiOH), magnesium nitrate ($Mg(NO_3)_2$), magnesium perchlorate ($Mg(ClO_4)_2$), potassium chlorate ($KClO_3$), potassium dichromate ($K_2Cr_2O_7$), potassium permanganate ($KMnO_4$), sodium hypochlorite (NaClO), sodium periodate ($NaIO_4$), zinc nitrate hydrate ($Zn(NO_3)_2$), ammonium nitrate (($NH_4)(NO_3)$), silver nitrate ($AgNO_3$), benzoyl peroxide ($C_{14}H_{10}O_4$), tetranitromethane ($CN_4O_8$), sodium perchlorate ($NaClO_4$), potassium perchlorate ($KClO_4$), potassium persulfate ($K_2S_2O_8$), sodium nitrate ($NaNO_3$), potassium chromate ($K_2CrO_4$), and mixtures thereof.

In addition to the base polymer, the acid, and the oxidant, the active layer 12 further comprises one or more colored materials. As used herein, the term "colored material" refers to a material that inherently has a color in its natural state. It is the colored material or materials that form the basis of the active layer's color when the layer is in the light-blocking state. In some embodiments, the colored material comprises one or more conducting polymers that can exist in two or more color states. When a conducting polymer is present in the active layer 12, the oxidant within the base polymer can polymerize the molecules of the conducting polymer monomers. Example conducting polymers include polyanilines (e.g., polyaniline (PANI), poly(ortho-anisidine) (POAS), poly(o-toluidine) (POT), poly(ethoxy-aniline) (POEA)), substituted polyanilines, polypyrroles, substituted polypyrroles, polythiophenes, polyindole, polycarbazole, substituted polycarbazole, polyaniline-rhodamine, polypyrrole-rhodamine, polythiophene-rhodamine, and mixtures thereof. In some embodiments, polyanilines are particularly suitable for use in the active layer 12. Polyaniline polymers can exist in a pernigraniline (violet) state, an emeraldine (blue to green) state, or a leucomeraldine (faded yellow to transparent) state.

In other embodiments, the colored material comprises one or more dyes. Example dyes include congo red, methylene blue (MB), eosin Y, methyl viologen, methyl orange, rhodamin B, crystal violet, acid fuschin, nigrosine, cationic dye, methyl orange, orange G, and mixtures thereof.

In related embodiments, the colored material includes both of one or more conducting polymers and one or more dyes. Examples of conducting polymers and dyes have been identified above.

Irrespective of its composition, the active layer 12 can be deposited on one of the layers 14, 16 using any one of a variety of deposition techniques, including electrochemically, by solution cast, or using a self-assembly technique.

As identified above, the active layer 12 can exist in either a light-blocking state in which relatively small amounts of (or no) light can be transmitted through the layer or a light-transmitting state in which relatively large amounts of (or all) light can be transmitted through the layer. In some embodiments, the active layer 12 is opaque or substantially opaque in the light-blocking state and transparent or substantially transparent in the light-transmitting state. In some embodiments, the active layer 12 can be in a colored state (i.e., its natural state) once the electrochromic device 10 has been fabricated prior to any electrical potential being applied. The depth (darkness) of this color depends upon the particularly colored materials that are used and their concentrations within the active layer 12. When a small electrical potential is applied to the active layer 12, for example, an electrical potential greater than 0 V and up to approximately 2 V, the active layer 12 oxidizes and becomes darker (i.e., more light blocking). Significantly, when the electrical potential is removed, the active layer 12 will remain in the darker colored state (or a state close to it). Accordingly, power is not required to maintain the light-blocking state.

In order to transition the active layer into the light-transmitting state, the electrical potential that was applied to the active layer 12 is reversed such that the active layer will have little or no electrical potential. When this is achieved, the active layer 12 will be transparent (i.e., no color) or nearly transparent (i.e., a very light color). Again, no power is required to maintain this state.

The above-described color-change phenomenon is schematically illustrated in FIGS. 1A and 1B. FIG. 1A shows the electrochromic device 10 after a voltage of 1.5 V to 2.0 V has been applied to the active layer 12 using a voltage source 22. As can be seen in FIG. 1A, the active layer 12 has become substantially opaque and is, therefore, in the light-blocking state. FIG. 1B shows the device 10 after the voltage has been reversed so that the active layer 12 has 0 V an electrical potential of 0 V to −0.5 V. As can be appreciated from FIG. 1B, the active layer 12 is substantially transparent.

Examples of Embodiments

The general construction and operation of the disclosed electrochromic devices having been described above, specific examples of electrochromic devices will now be discussed.

Various active layer gels were prepared for experimentation purposes. The gels were applied between FTO-coated glass plates both with and without a physical spacer. A one nanometer to 10 μm thickness film can be formed by simply applying the gel between two FTO coated glasses with gentle pressure. Electrochromic devices comprising a thin layer of PVA+APS+MB, PVA+APS+PANI, and PVA+APS+MB+PANI were constructed. The electrochromic devices were approximately 2 in.×2 in. in width and length. The gels were enabled to settle and dry before the experiments were performed. In some cases, the edges of the electrochromic devices were sealed using Loctile super-glue.

Figure 2A:
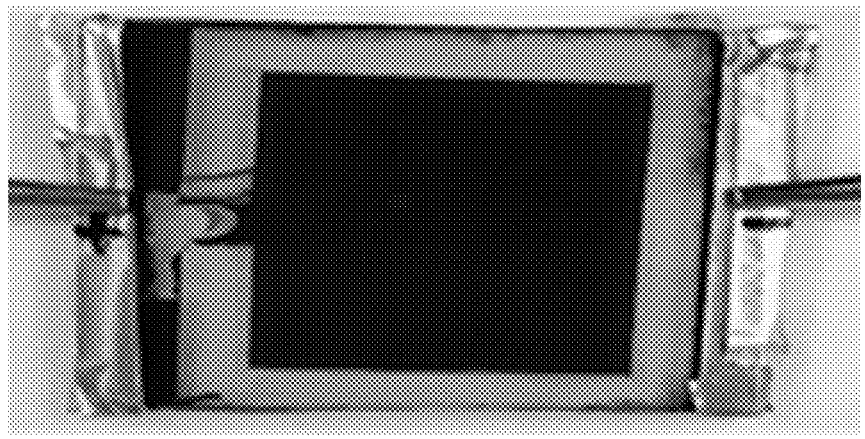
FIGS. 2A and 2B are images of a fabricated electrochromic device having a single polyvinyl alcohol (PVA)+ammonium perdisulphate (APS)+methylene blue (MB)+polyaniline (PANI) active layer shown in a light-blocking state and a light-transmitting state, respectively.
Figure 2B:
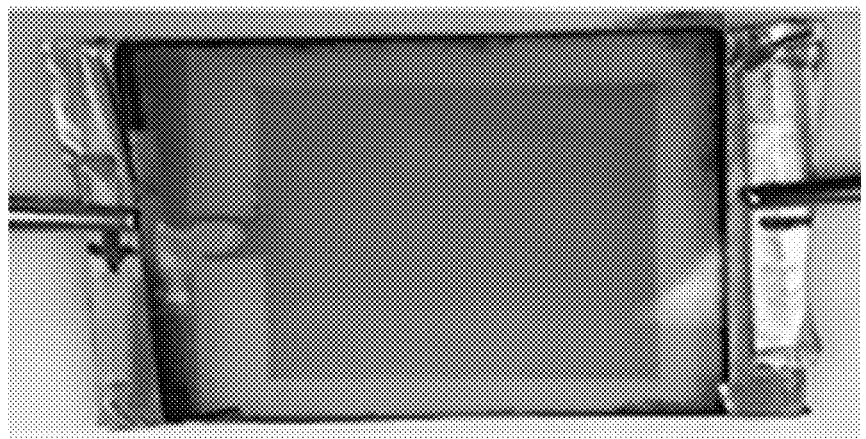

FIGS. 2A and 2B are images of a fabricated single active layer electrochromic device. The active layer comprised a gel mixture of PVA+APSMB+PANI. When 2 V was applied to the active layer, a substantially opaque state shown in FIG. 2A resulted. When the electrical potential of the gel was reduced to −0.5 V, a substantially transparent state shown in FIG. 2B resulted. As can be appreciated from FIG. 2B, the gel is not merely translucent as the color is so light that detailed images could be seen through the gel.

Figure 3A:
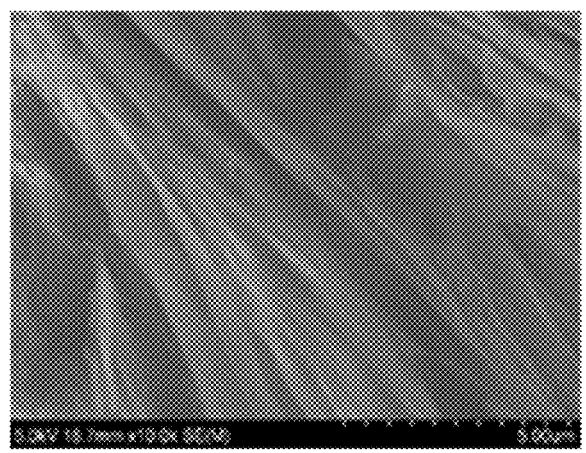
FIGS. 3A, 3B, 3C are scanning electron microscope (SEM) images of PVA+APS+MB, PVA+APS+PANI, and PVA+APS+MB+PANI active layers, respectively.
Figure 3B:
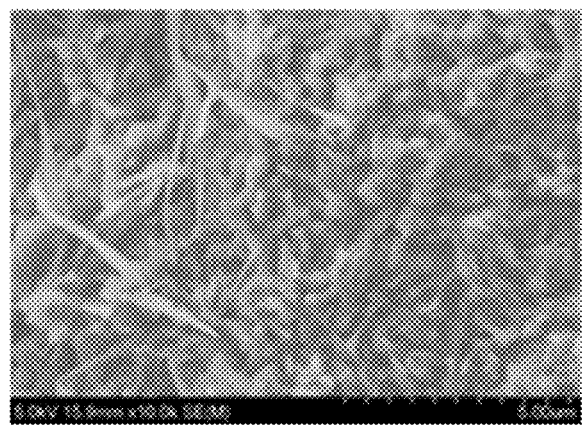
Figure 3C:
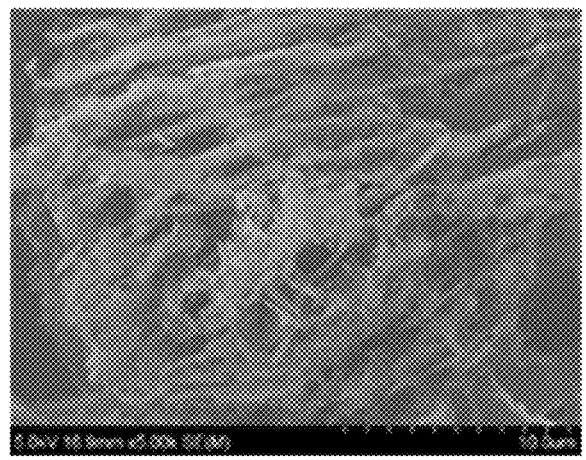

FIGS. 3A-3C present scanning electron microscope (SEM) images of three different active layer gels, including PVA+APS+MB, PVA+APS+PANI, and PVA+APS+MB+PANI, respectively that were formed on FTO-coated glass and dried at room temperature. The surface properties of the gels are important to understand the mechanism of color change in the active layer. FIGS. 3A and 3B show typical compact symmetric structure with packed pebble-like structure. A small amount of methylene blue dye added to the PVA+APS+MB+PANI active layer produced a fibrillar structure (FIG. 3C).

Figure 4:
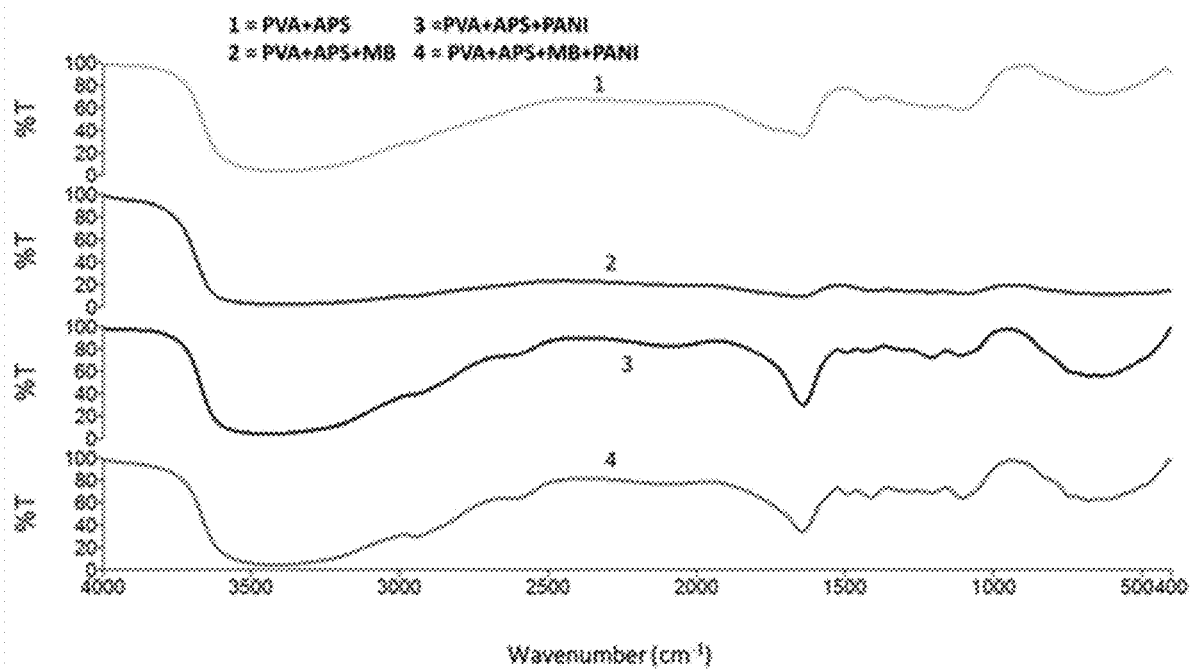
FIG. 4 is a graph that shows Fourier-transform infrared spectroscopy (FTIR) transmission peaks for a PVA+APS active layer.

FIG. 4 shows Fourier-transform infrared spectroscopy (FTIR) transmission peaks at 3416 nm (stretching vibration O—H with strong hydrogen bonding intermolecular and intramolecular types), 2953 $cm^{-1}$ (to C—H alkyl group), 2345 $cm^{-1}$, 2099 $cm^{-1}$, 1737 $cm^{-1}$ (C=O), 1650 $cm^{-1}$ (C=O stretching), 1409 $cm^{-1}$ (C—H$_2$), 1206 $cm^{-1}$ (C—N stretching of amine), 1105 $cm^{-1}$ (is due to S=O), and 820 $cm^{-1}$ (C—S bond) for a PVA+APS gel. The characteristics peaks of PVA+APS gel at 3420 $cm^{-1}$, 2927 $cm^{-1}$, 2156 $cm^{-1}$, 1645 $cm^{-1}$, 1418 $cm^{-1}$, 1221 $cm^{-1}$, 1090 $cm^{-1}$, 839 $cm^{-1}$, and 593 $cm^{-1}$ with little were observed due to presence of methylene blue in Curve 2. The peak 1409 $cm^{-1}$ has been shifted to 1418 $cm^{-1}$ due to the presence of methylene blue. The characteristic peaks of methylene blue at 1595 $cm^{-1}$, 1487 $cm^{-1}$, 1390 $cm^{-1}$ as well as 816 $cm^{-1}$ were not observed. Instead, the characteristic peaks shifted due to the presence of methylene blue in PVA+APS+MB gel, as shown in Curve 2. The presence of polyaniline in PVA+APS+PANI+MB resulted in transmission peaks at 3445 $cm^{-1}$ (v(N—H) (stretching vibrations), 3222 $cm^{-1}$ (H-bonded v(N—H), 2948 $cm^{-1}$, 2601 $cm^{-1}$, 1645 $cm^{-1}$ (1486 benzenoid ring stretching), 1418 $cm^{-1}$ (phenyl ring stretching), 1312 $cm^{-1}$ (v(C—N$^+$), 1211 $cm^{-1}$ (v(C—N), 1109 $cm^{-1}$ (B—NH—B/δ(C—H), 728 $cm^{-1}$ (c(C—H) (monosubstituted or 1,2-disubstituted ring), 685 $cm^{-1}$ (out-of-plane ring bending (monosubstituted ring)), 598 $cm^{-1}$ (Cl—), and 482 $cm^{-1}$, as shown in Curve 3. The peak at 1109 $cm^{-1}$ is associated with charged polymer units quinoid (Q)=NH+-benzene B or (B)—NH$^+$—B. PVA+APS+PANI+MB had FTIR transmission peaks at 3416 $cm^{-1}$, 3213 $cm^{-1}$, 2943 $cm^{-1}$, 2601 $cm^{-1}$, 2108 $cm^{-1}$, 1640 $cm^{-1}$, 1491 $cm^{-1}$, 1408 $cm^{-1}$, 1283 $cm^{-1}$, 1201 $cm^{-1}$, 1098 $cm^{-1}$, 820 $cm^{-1}$, 733 $cm^{-1}$, 675 $cm^{-1}$, 612 $cm^{-1}$, 521 $cm^{-1}$, and 477 $cm^{-1}$, as shown in Curve 4. The peaks were due to the presence of polyvinyl alcohol, methylene blue, and polyaniline in doped states.

Figure 5:
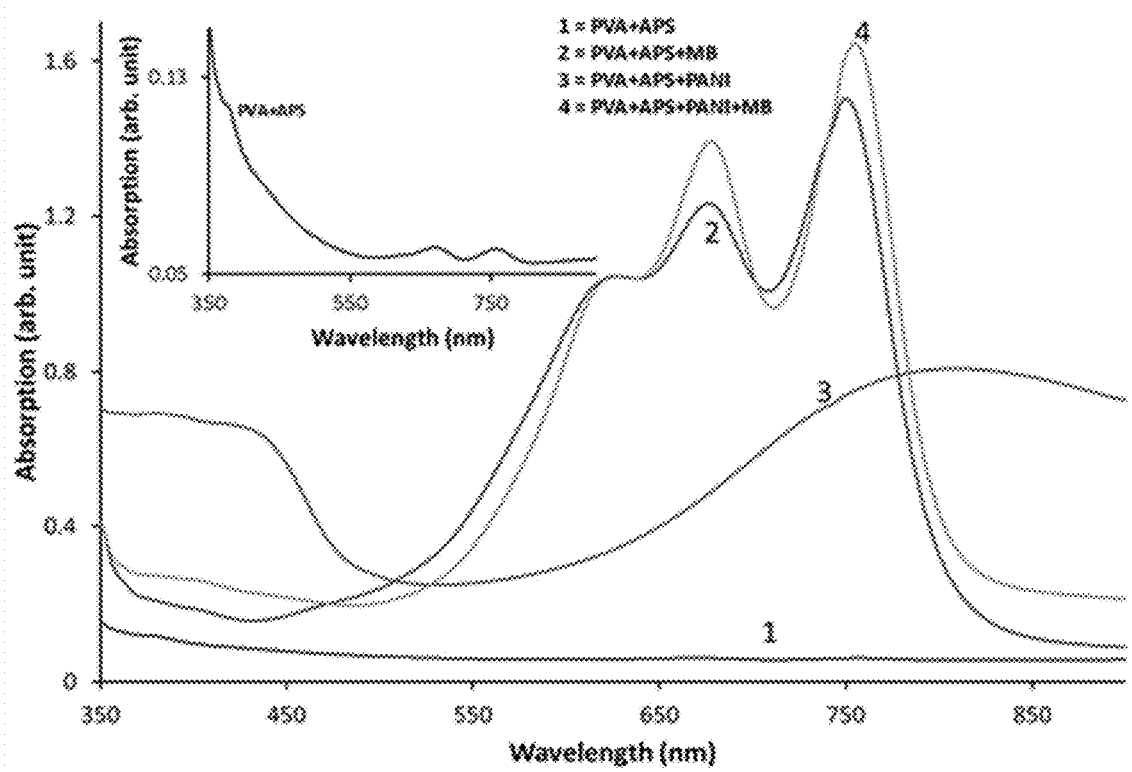
FIG. 5 is a graph that shows UV-vis optical absorption for various active layers.

Curve 1 in FIG. 5 reveals UV-vis optical absorption at 381 nm, 673 nm, and 764 nm of PVA+APS gel coated on glass plate and dried at room temperature. Curve 2 shows the UV-vis absorption at 405 nm, 623 nm, 679 nm, 739 nm, and 753 nm for PVA+HCl+APS+MB based gel deposited on glass substrate. Curve 3 shows UV-vis absorption peaks at 386 nm, 427 nm, and 820 nm for PVA+APS+PANI+MB. However, the absorption peaks at 405 nm, 626 nm, 680 nm, 739 nm, and 757 nm were observed for PVA+APS+PANI+MB electrolyte on glass plate. The presence of a peak at 820 nm in Curve 3 and 757 nm in Curve 4 of FIG. 5 are indicative of the doped state of polyaniline regardless of the presence of ammonium perdisulphate oxidant.

Figure 6A:
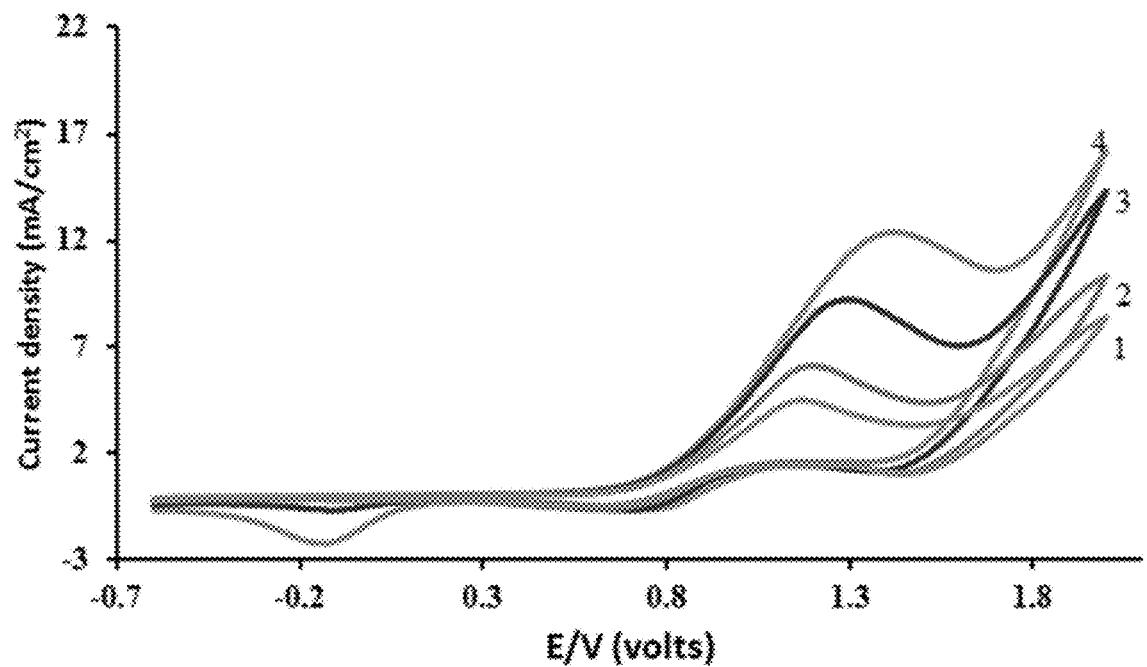
FIG. 6A is a graph that shows cyclic voltammetries (CVs) of a PVA+APS+MB device as a function of scan rate.

Electrochromic devices were fabricated by applying a layer of the gel between two FTO-coated glass plates for the purpose of studying the electrochromic response of the gels. The fabricated devices were tested by applying electrical potentials to the conductive glass plates. FIG. 6A shows cyclic voltammetries (CVs) of a PVA+APS+MB device as a function of the scan rate. The CVs show oxidation peaks varying from 1.49 V to 1.42 V, whereas the reduction peaks from the four different scan rates were observed at ~1.48 V, ~0.73 V, and ~−0.13 V. A dark blue color change was observed at around 1.45 V depending upon the scan potential. However, a substantially transparent color was observed for the potential around −0.2 V. The complete reversibility in coloration of PVA+APS+MB device was found between the potential range of 2.0 V to −0.5 V.

Figure 6B:
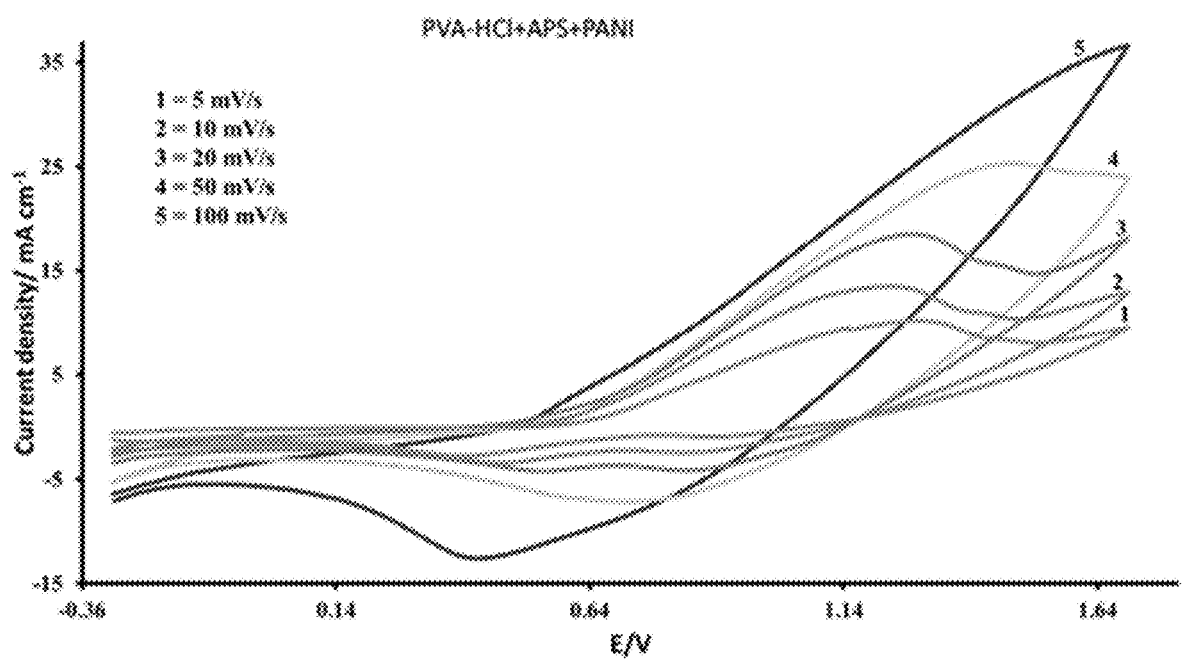
FIG. 6B is a graph that shows CVs of a PVA+APS+PANI device as a function of scan rate.

FIG. 6B shows CVs of a PVA+APS+PANI device. A broad oxidation peak can be observed at 1.30 V to 1.69 V, and a small peak can be observed at 1.37 V to 1.67 V. A reduction peak occurred at 0.47 V and 0.8 V as a function of scan rate.

Figure 6C:
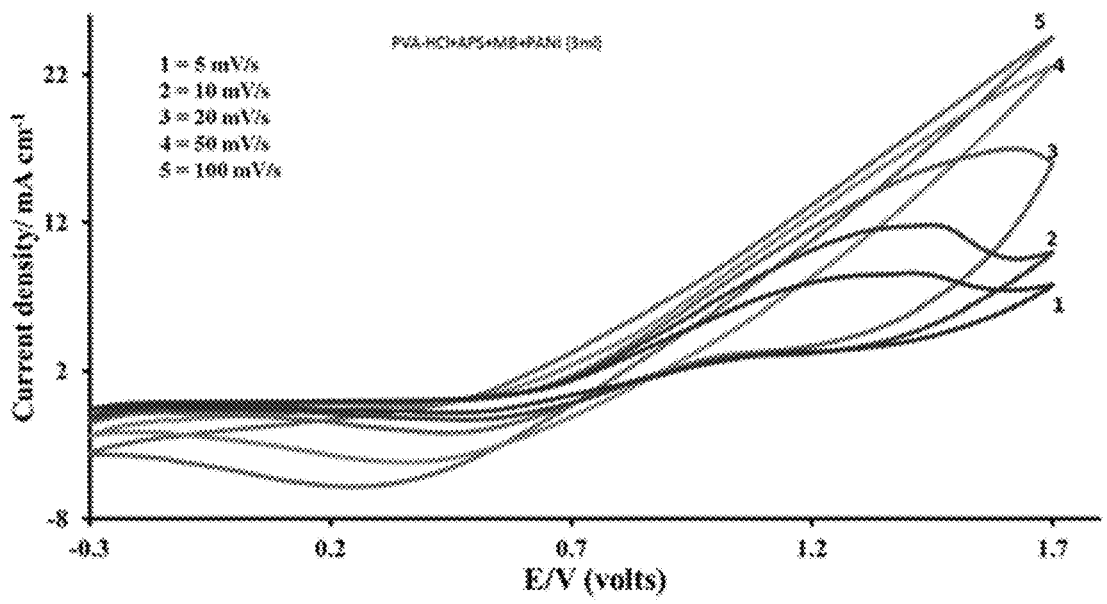
FIG. 6C is a graph that shows CVs of a PVA+APS+PANI+MB device as a function of scan rate.
Figure 7A:
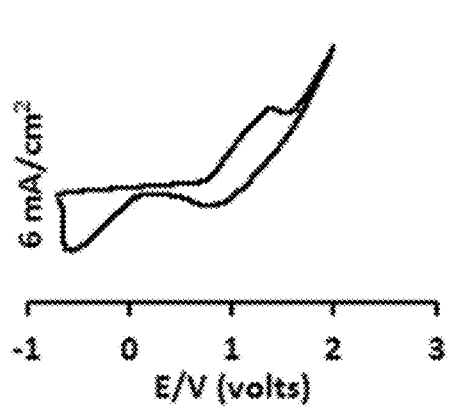
FIGS. 7A, 7B, 7C, and 7D are graphs that show CVs of PVA+APS+PANI+MB devices at 50 mV/sec where the active layer is formed by keeping molar ratios of aniline to methylene blue at 1:2.0, 1:2.5, 1:3, and 1:5, respectively.
Figure 7B:
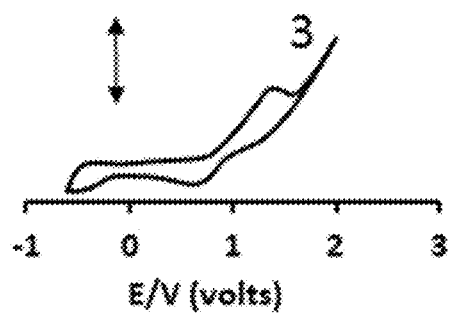
Figure 7C:
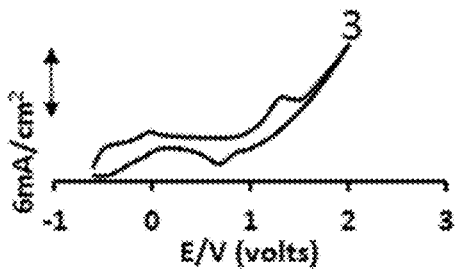
Figure 7D:
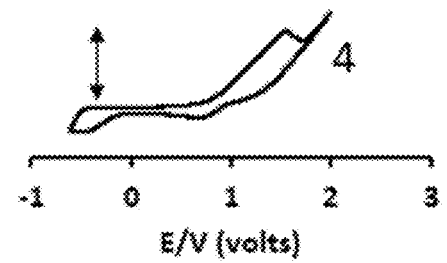

FIG. 6C shows the CVs of PVA+APS+PANI+MB. The range of redox potential changed as a function of scan rate. The increase in current is proportional to scan rate and the process was diffusion controlled. However, there was a shift in the oxidation potential at ~1.4 V for the scan rate of 50 mV/sec and 100 mV/sec indicating that the redox materials in the layer are not confined to the surface electrodes at scans at higher potentials. The reversibility in the CVs shows that the reaction is a diffusion process. However, the shift in the redox peak potential is a contribution from migration and adsorption effects besides diffusion control.

FIGS. 7A-7D shows the CVs of PVA+APS+PANI+MB devices at 50 mV/sec, where the gel was formed by keeping various molar ratios of aniline to methylene blue at 1:2.0, 1:2.5, 1:3, and 1:5, respectively. The gel containing a methylene blude to analine ratio of 1:2.5 to 1:3.0 has better color contrast and a faster switching response (100 ms). The redox potential for the PVA+APS+PANI+MB device exhibited a sharp oxidation peak at around 1.42 V and a reduction peak at around −0.5 V. However, the reduction peak occurred at 0.06 V, which shows transition in the color change from dark blue to green and further, faded yellow or transparent by approaching at −0.5 V.

Figure 8A:
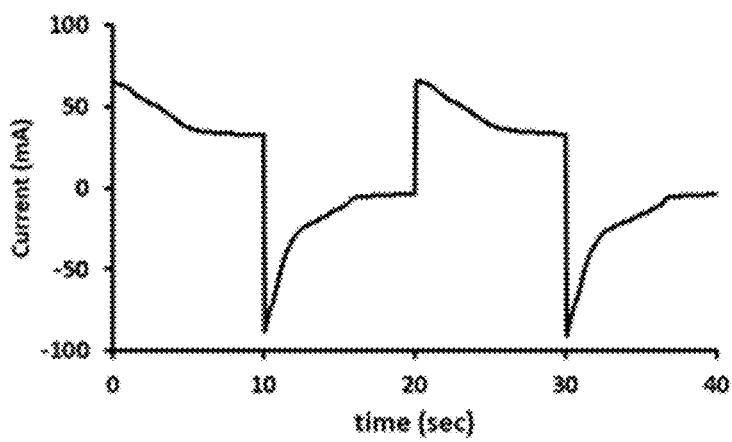
FIGS. 8A, 8B, and 8C are graphs that show chronoamperometric results for PVA+APS+PANI, PVA+APS+MB, and PVA+APS+MB+PANI devices.
Figure 8B:
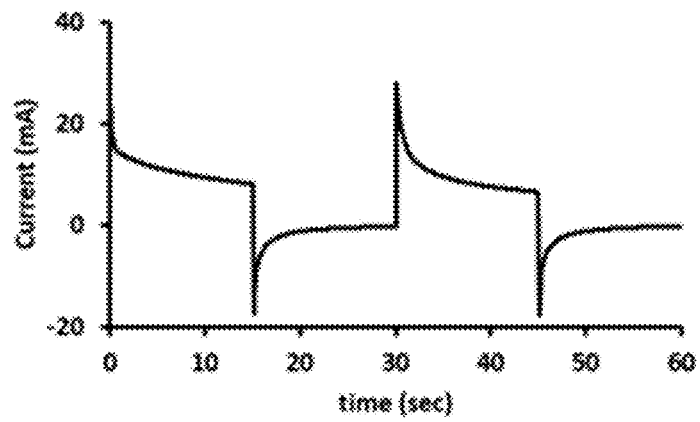
Figure 8C:
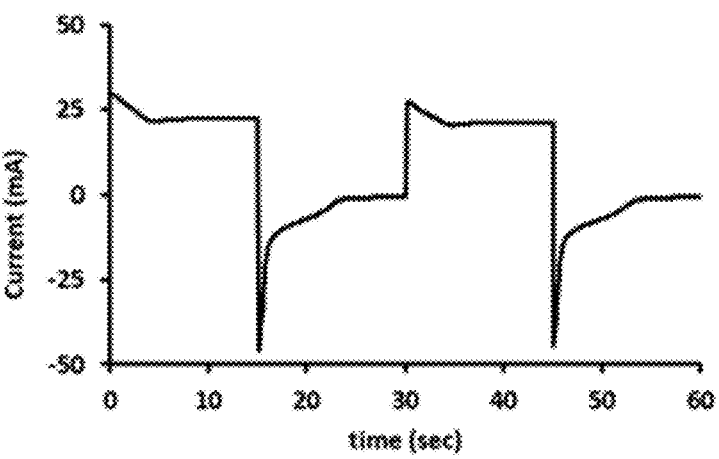
Figure 9:
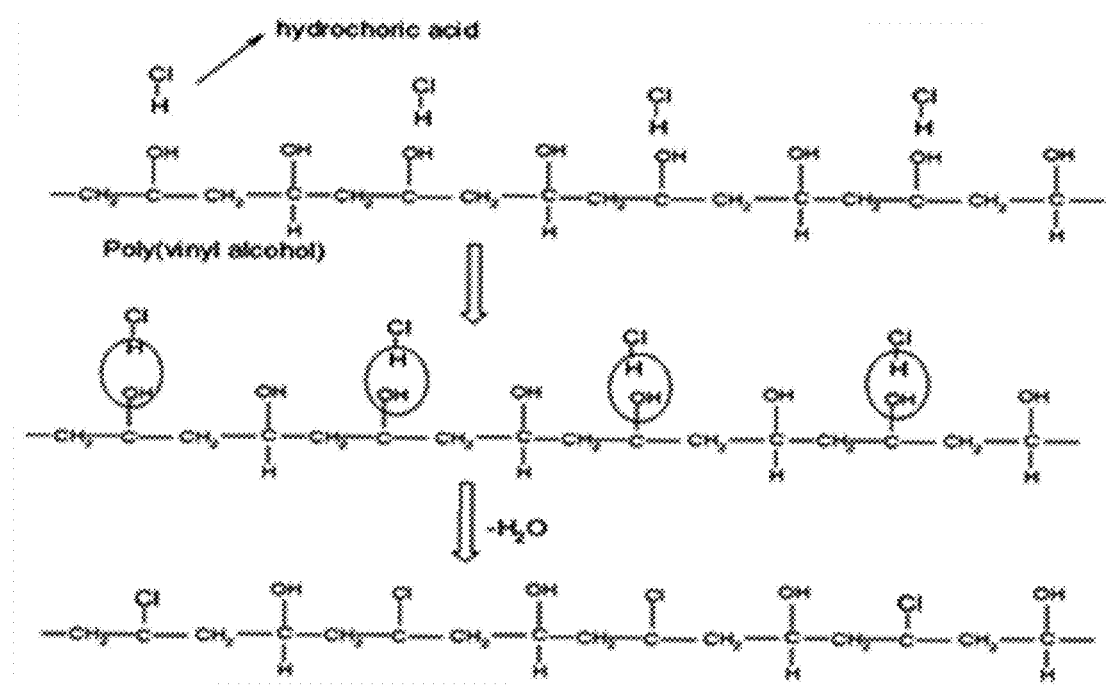
FIG. 9 is a diagram that illustrates the gelling process of polyvinyl alcohol in hydrogen chloride.

FIGS. 8A-8C show chronoamperometric results of PVA+APS+PANI, PVA+APS+MB, and PVA+APS+MB+PANI in a single active layer between two FTO-coated glass plates. FIG. 8A shows chronoamperometric results for the PVA+APS+PANI layer, indicating that the reduction current is larger than the oxidation of the electrolyte. The chronoamperometric study was performed by applying a pulse between the two oxidation and reduction potentials. However, no biasing current was applied to compensate the self-erasing reactions. The potential was applied at 1.5 V and immediately changed to −0.5 V. The colored state remained at 1.5 V and application of −0.5 V showed the reduction state of the layer. When the applied 1.5 V was switched off, the dark blue color lasted for a long time. Similarly, when the applied −0.5 V was switched off, a nearly transparent color lasted for several hours. That the dark- and light-colored states remained after cutting of the applied potential is indicative of the potential as a window for the single active layer electrochromic device. FIG. 8B shows the redox process of PVA+APS+MB for a single active layer electrochromic device. As shown in FIG. 8C, the redox processes for PVA+APS+PANI+MB are asymmetric, similar to PVA+APS+PANI. The polyaniline and methylene blue present in the PVA+APS+PANI+MB contributes to faster coloration and decoloration as compared to polyaniline and methylene blue present in the PVA+APS device.

Figure 10:
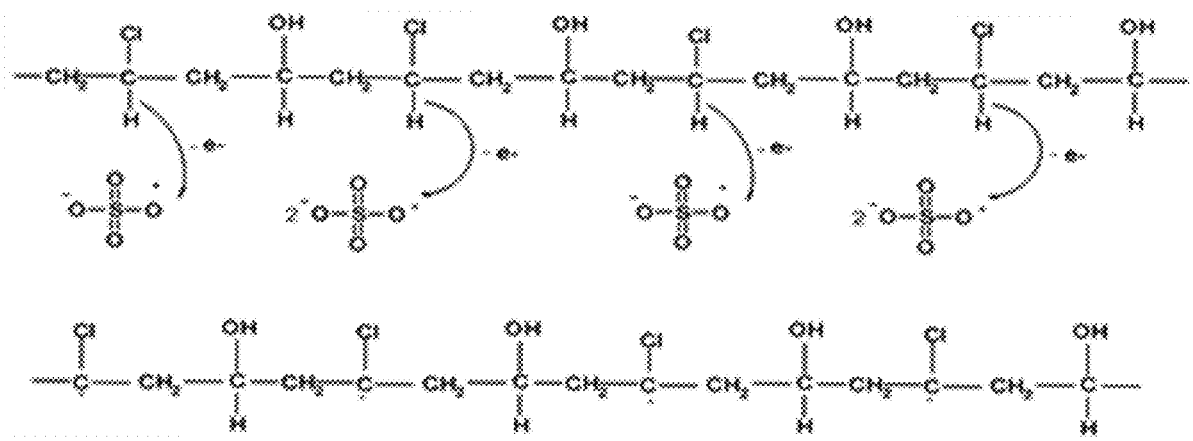
FIG. 10 is a diagram that illustrates the gelling process of polyvinyl alcohol in hydrogen chloride with ammonium persulfate as an oxidant.

The mechanism of gelling of the active layer will now be discussed. The polyvinyl alcohol gelling depends on the condensation reaction and temperature applied to the polyvinyl alcohol in a hydrogen chloride (HCl) solution. The water molecules are released and chlorine atoms of the HCl attach to the polyvinyl alcohol in the gelling process. FIG. 10 illustrates the gelling process of polyvinyl alcohol in an HCl solution.

Figure 11:
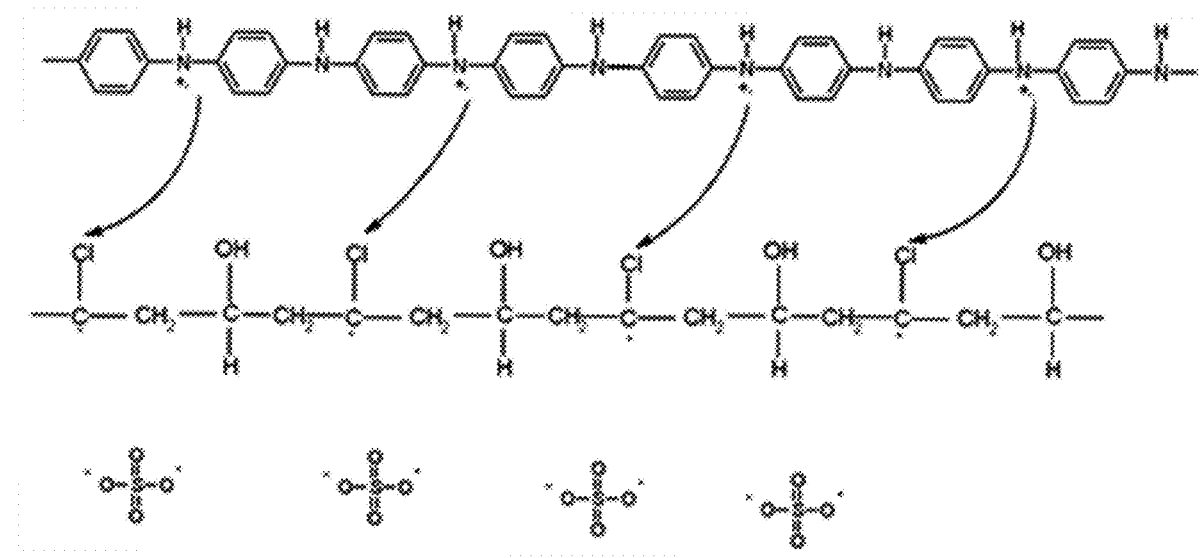
FIG. 11 is a diagram that illustrates the formation of emeraldine salt in the presence of hydrogen chloride and ammonium persulfate after polymerization of aniline to emeraldine salt.

Adding ammonium perdisulphate oxidant to the polyvinyl alcohol gel causes the loss of electrons from the structure. This process produces the lone-pair effect in the carbon structure, as shown in FIG. 11.

Figure 12:
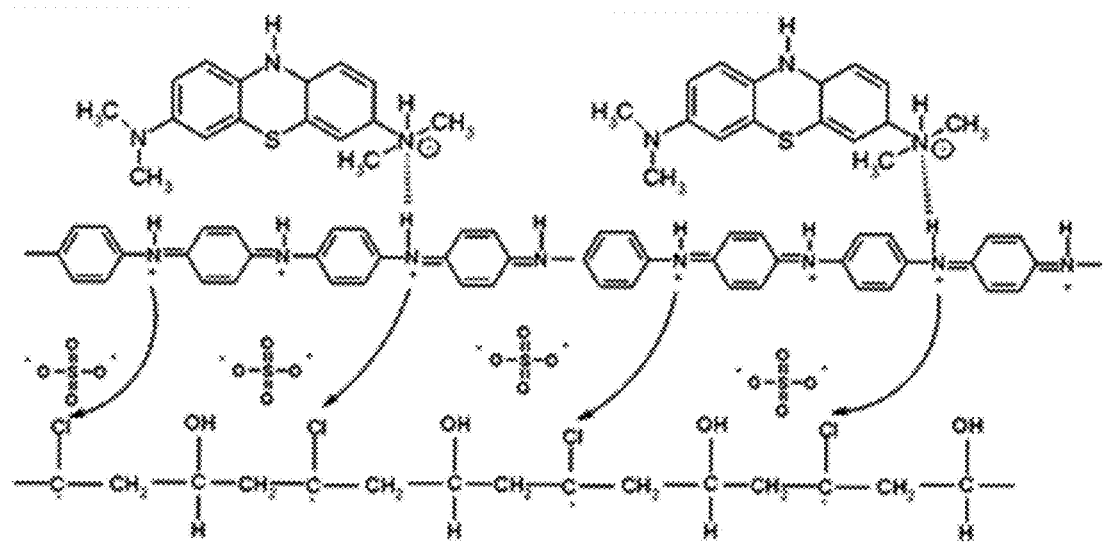
FIG. 12 is a diagram that illustrates emeraldine salt changing to pernigraniline due to presence of ammonium persulfate and oxidized polyvinyl alcohol in ammonium persulfate.

Adding aniline to PVA+APS causes oxidative polymerization and forms the emeraldine salt (ES) form of polyaniline. The possible interaction of emeraldine salt with PVA+APS gel forms a PVA+APS+PANI structure. The emeraldine salt state interacts with chlorine atoms in PVA+APS gel due to lone-pair effect of the emeraldine salt state of polyaniline, as shown in FIG. 12. However, the presence of ammonium perdisulphate causes the oxidation of the emeraldine salt state and forms a pernigraniline state (purple or dark blue in color) of polyaniline (based on UV-vis measurement and optical observation).

Figure 13:
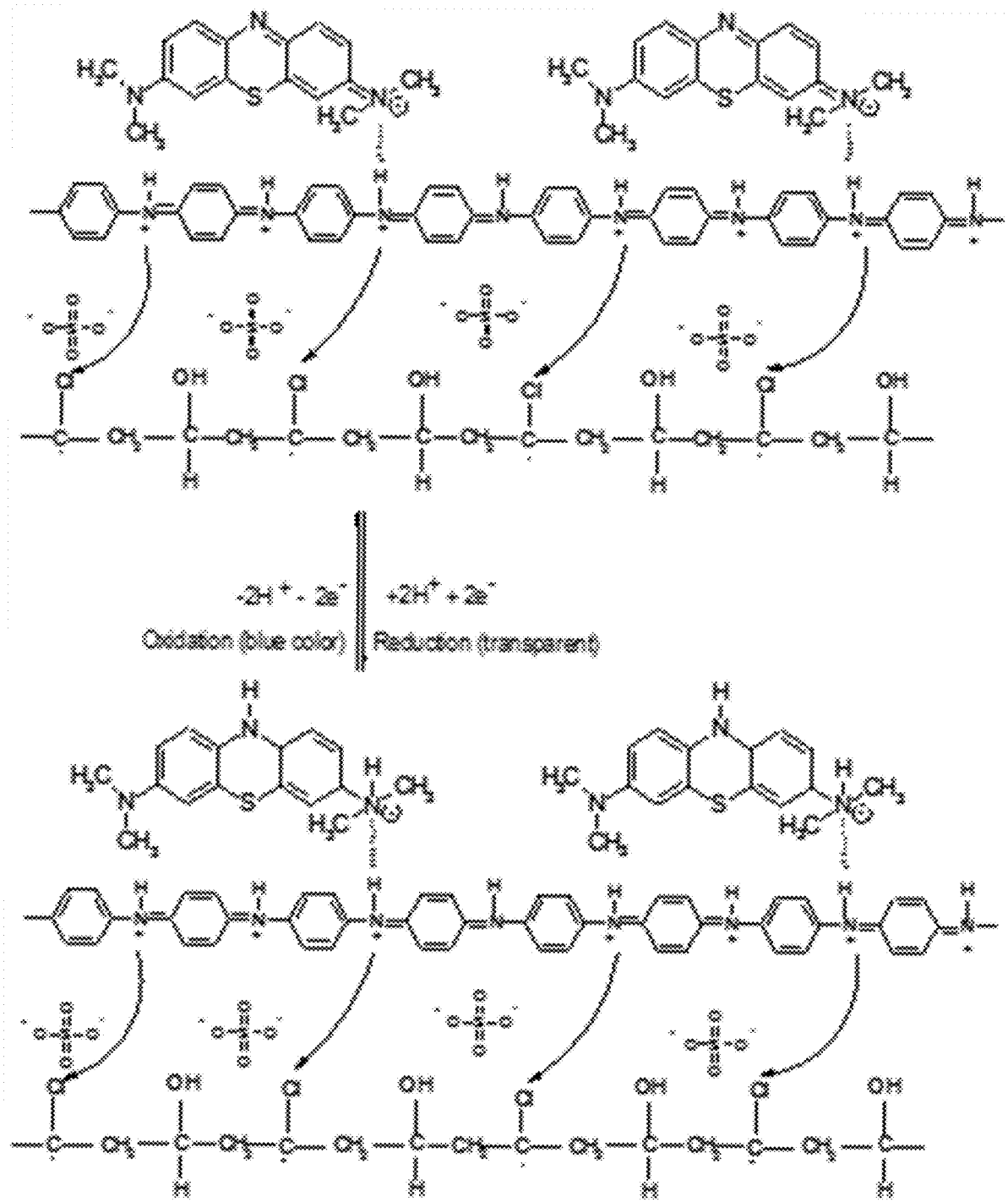
FIG. 13 is a diagram illustrating coloration and decoloration due to the application of a voltage across a single PVA+HCl+APS+MB+PANI active layer.

FIG. 13 illustrates the possible interaction of methylene blue with the PVA+APS+PANI structure. There is a weak bond that is established between the nitrogen of methylene blue to hydrogen-bonded with nitrogen present in polyaniline structure. The application of a voltage to the PVA+APS+MB+PANI device produces a color change from blue to transparent or faded yellow. The oxidation of methylene blue and polyaniline produces a dark blue color in the PVA+APS+MB+PANI device, as shown in FIG. 14. The color changes from dark blue to substantially transparent by applying a potential varying from a range of −0.5 V to 0 V to a range of 1.5 V to 2 V. However, the maximum −0.5 V potential brings about a transparent state faster. To achieve the electrochromic behavior in a single layer, the electron donor and electron acceptor must be present in the structure.

Notably, the electrochromic device has been achieved with MB+APS+PVA, PVA+APS+PANI, as well as PVA+APS+MB+PANI gels. The color contrast, potential window, stability of gel, and the reversibility of the device are dependent of the type of gel. The PVA+APS+MB gel showed state reversibility for nearly 100 to 200 cycles, whereas the PVA+APS+PANI gel did not have better color contrast. However, PVA+APS+MB+PANI gel operated through greater than 1000 cycles with no decay and had better color contrast with 60% transparency. The application of a gel is simple and it can be easily applied, thereby eliminating the need for any complicated vacuum process, such as sputtering, ion-beam, etc.

In summary, the disclosed electrochromic devices are unique in that they comprise a single active layer that includes a base polymer, an acid, an oxidant, and a conducting polymer, dye, or both. The range of potential for transparency (or substantial transparency) is between approximately −0.5 V to 0 V and a dark color (e.g., dark blue) is observed in the range of approximately 1.5 V to 2.0 V. The single active layer electrochromic devices can be easily applied to window applications as well as goggle application without involving complicated fabrication processes, which are common for conventional electrochromic devices. The single active layer electrochromic devices can further be integrated with small solar cells that can generate the voltages required to darken the device for energy saving applications.

What is claimed is:

1. An electrochromic device comprising:
   an electrically-conducting layer of anodic material;
   an electrically-conducting layer of cathodic material;
   a single active electrochromic material layer of polymer gel that contains base polymer material, an oxidant configured to cause loss of electrons from the base polymer material, and a colored material that includes a dye, wherein the single active electrochromic polymer gel material layer is disposed between and in contact with said layer of anodic material and said layer of cathodic material;

wherein the device is configured be alternately placed in a first light-transmitting state, in which relatively large amount of light can be transmitted through the device, and a second light-blocking state, in which relatively small amount of light can be transmitted through the device, wherein the device comprises no other active layer of material that contributes to transitioning of the device between said first and second light-transmitting states.

2. The device according to claim 1, wherein the base polymer material comprises one or more of polyvinyl alcohol (PVA), poly (vinyl acetate), poly (vinyl alcohol co-vinyl acetate), polyvinyl acetate-vinyl alcohol, poly (methyl methacrylate, poly (vinyl alcohol-co-ethylene ethylene), poly (vinyl butyral-co-vinyl alcohol-co-vinyl acetate), poly(vinyl alcohol)-acrylamide, polyvinyl butyral, polyvinyl chloride, poly(vinyl nitrate), substituted poly(vinyl alcohol), carboxylated poly(vinyl alcohol), and poly(vinyl chloride-co-vinyl acetate-co-vinyl alcohol), polyacrylamides, polyamines, and polyvinylpyrrolidone.

3. The device according to claim 1, wherein the single active electrochromic polymer gel material layer further comprises an acid.

4. The device according to claim 3, wherein the acid comprises one or more of glacial acetic acid ($CH_3COOH$), propionic acid ($C_3H_5O_2$), hydrochloric acid (HCl), hydrofluoric acid (HF), phosphoric acid ($H_3PO_4$), acetic acid (non-glacial) ($CH_3COOH$), sulfuric acid ($H_2SO_4$), formic acid ($CH_2O_2$), benzoic acid ($C_6H_5COOH$), nitric acid ($HNO_3$), phosphoric acid ($H_3PO_4$), sulfuric acid ($H_2SO_4$), tungstosilicic acid hydrate ($H_4[Si(W_3O_{10})_4] \cdot xH_2O$), hydriodic acid (HI), carboxylic acids ($C_nH_{2n+1}COOH$), dicarboxylic acid ($HO_2C—R—CO_2H$), tricarboxylic acid ($C_6H_8O_7$), oxalic acid ($C_2H_2O_4$), hexacarboxylic acid ($C_{12}H_6O_{12}$), citric acid (C6HsO7), and tartaric acid (C4H5Q5).

5. The device according to claim 1, wherein the oxidant comprises one or more of aluminum nitrate ($Al(NO_3)_3$), ammonium dichromate (($NH_4$)$_2Cr_2O_7$), ammonium perdisulphate (APS) (($NH_4$)$_2S_2O_8$), barium nitrate ($Ba(NO_3)_2$), bismuth nitrate ($Bi(NO_3)_3 \cdot 5H_2O$), calcium hypoperchlorate ($Ca(ClO)_2$), copper (II) nitrate ($Cu(NO_3)_2$), cupric nitrate ($Cu(NO_3)_2$), ferric nitrate ($Fe(NO_3)_3$), hydrogen peroxide ($H_2O_2$), lithium hydroxide monohydrate (LiOH), magnesium nitrate ($Mg(NO_3)_2$), magnesium perchlorate ($Mg(ClO_4)_2$), potassium chlorate ($KClO_3$), potassium dichromate ($K_2Cr_2O_7$), potassium permanganate ($KMnO_4$), sodium hypochlorite (NaClO), sodium periodate ($NaIO_4$), zinc nitrate hydrate ($Zn(NO_3)_2$), ammonium nitrate (($NH_4$)($NO_3$)), silver nitrate ($AgNO_3$), benzoyl peroxide (($C_6H_5$—C(=O)O—)), tetranitromethane ($C(NO_2)_4$), sodium perchlorate ($NaClO_4$), potassium perchlorate ($KClO_4$), potassium persulfate ($K_2S_2O_8$), sodium nitrate ($NaNO_3$), and potassium chromate ($K_2CrO_4$).

6. The device according to claim 1, wherein the colored material comprises an electrically-conducting polymer.

7. The device according to claim 1, wherein the single active electrochromic poly gel material layer comprises one or more of polyvinyl alcohol (PVA), poly (vinyl acetate), poly (vinyl alcohol co-vinyl acetate), polyvinyl acetate-vinyl alcohol, poly (methyl methacrylate, poly (vinyl alcohol-co-ethylene ethylene), poly (vinyl butyral-co-vinyl alcohol-co-vinyl acetate), poly(vinyl alcohol)-acrylamide, polyvinyl butyral, polyvinyl chloride, poly(vinyl nitrate), substituted (butyryl, palmitic, capryloyl, lauric, myristic, and stearic acids, myristol, halogens, azide, or amines, poly(vinyl alcohol), carboxylated poly(vinyl alcohol), poly(vinyl chloride-co-vinyl acetate-co-vinyl alcohol), poly(vinyl acetate-co-acrylic acid), poly(vinyl alcohol-co-acrylic acid), poly(vinyl alcohol)-acrylamide, poly(vinyl alcohol)-salicylic acid, poly (vinyl methyl ketone), and mixtures thereof.

8. The device according to claim 1, wherein the single active electrochromic polymer gel material layer comprises one or more of congo red, methylene blue, methylene blue, eosin Y, methyl viologen, methyl orange, rhodamin B, crystal violet, acid fuschin, nigrosine, cationic dye, methyl orange, and orange G.

9. The device according to claim 1, wherein the oxidant is configured to polymerize molecules of monomers of the base polymer.

10. The device according to claim 1, wherein said single active electrochromic polymer gel material layer is configured to be in the second light-blocking state prior to any electrical potential being applied thereto.

11. The device according to claim 1, wherein the base polymer material comprises one or more of polyvinyl alcohol (PVA), poly (vinyl acetate), poly (vinyl alcohol co-vinyl acetate), polyvinyl acetate-vinyl alcohol, poly (methyl methacrylate, poly (vinyl alcohol-co-ethylene ethylene), poly (vinyl butyral-co-vinyl alcohol-co-vinyl acetate), poly(vinyl alcohol)-acrylamide, polyvinyl butyral, polyvinyl chloride, poly(vinyl nitrate), substituted poly(vinyl alcohol), carboxylated poly(vinyl alcohol), and poly(vinyl chloride-co-vinyl acetate-co-vinyl alcohol), polyacrylamides, polyamines, and polyvinylpyrrolidone.

12. The device according to claim 1, wherein the single active electrochromic material layer of polymer gel further comprises an acid.

13. The device according to claim 3, wherein the acid comprises one or more of glacial acetic acid ($CH_3COOH$), propionic acid ($C_3H_5O_2$), hydrochloric acid (HCl), hydrofluoric acid (HF), phosphoric acid ($H_3PO_4$), acetic acid (non-glacial) ($CH_3COOH$), sulfuric acid ($H_2SO_4$), formic acid ($CH_2O_2$), benzoic acid ($C_6H_5COOH$), nitric acid ($HNO_3$), phosphoric acid ($H_3PO_4$), sulfuric acid ($H_2SO_4$), tungstosilicic acid hydrate ($H_4[Si(W_3O_{10})_4] \cdot xH_2O$), hydriodic acid (HI), carboxylic acids ($C_nH_{2n+1}COOH$), dicarboxylic acid ($HO_2C—R—CO_2H$), tricarboxylic acid ($C_6H_8O_7$), oxalic acid ($C_2H_2O_4$), hexacarboxylic acid ($C_{12}H_6O_{12}$), citric acid (C6HsO7), and tartaric acid (C4H5Q5).

14. The device according to claim 1, wherein the oxidant comprises one or more of aluminum nitrate ($Al(NO_3)_3$), ammonium dichromate (($NH_4$)$_2Cr_2O_7$), ammonium perdisulphate (APS) (($NH_4$)$_2S_2O_8$), barium nitrate ($Ba(NO_3)_2$), bismuth nitrate ($Bi(NO_3)_3 \cdot 5H_2O$), calcium hypoperchlorate ($Ca(ClO)_2$), copper (II) nitrate ($Cu(NO_3)_2$), cupric nitrate ($Cu(NO_3)_2$), ferric nitrate ($Fe(NO_3)_3$), hydrogen peroxide ($H_2O_2$), lithium hydroxide monohydrate (LiOH), magnesium nitrate ($Mg(NO_3)_2$), magnesium perchlorate ($Mg(ClO_4)_2$), potassium chlorate ($KClO_3$), potassium dichromate ($K_2Cr_2O_7$), potassium permanganate ($KMnO_4$), sodium hypochlorite (NaClO), sodium periodate ($NaIO_4$), zinc nitrate hydrate ($Zn(NO_3)_2$), ammonium nitrate (($NH_4$)($NO_3$)), silver nitrate ($AgNO_3$), benzoyl peroxide (($C_6H_5$—C(=O)O—)), tetranitromethane ($C(NO_2)_4$), sodium perchlorate ($NaClO_4$), potassium perchlorate ($KClO_4$), potassium persulfate ($K_2S_2O_8$), sodium nitrate ($NaNO_3$), and potassium chromate ($K_2CrO_4$).

15. An electrochromic device comprising:
an electrically-conducting layer of anodic material;
an electrically-conducting layer of cathodic material;
a single active electrochromic material layer of polymer gel that contains base polymer material, an oxidant configured to cause loss of electrons from the base polymer material, and one or more of congo red, methylene blue, methylene blue, eosin Y, methyl viologen, methyl orange, rhodamin B, crystal violet, acid fuschin, nigrosine, cationic dye, methyl orange, and orange G,
wherein the single active electrochromic material layer of polymer gel is disposed between and in contact with said layer of anodic material and said layer of cathodic material;
wherein the device is configured be alternately placed in a first light-transmitting state, in which relatively large amount of light can be transmitted through the device, and a second light-blocking state, in which relatively small amount of light can be transmitted through the device,
wherein the device comprises no other active layer of material that contributes to transitioning of the device between said first and second states.

16. The device according to claim 15, the single active electrochromic material layer of polymer gel comprises an electrically-conducting polymer.

17. The device according to claim 15, wherein the single active electrochromic material layer of polymer gel comprises one or more of polyvinyl alcohol (PVA), poly (vinyl acetate), poly (vinyl alcohol co-vinyl acetate), polyvinyl acetate-vinyl alcohol, poly (methyl methacrylate, poly (vinyl alcohol-co-ethylene ethylene), poly (vinyl butyral-co-vinyl alcohol-co-vinyl acetate), poly(vinyl alcohol)-acrylamide, polyvinyl butyral, polyvinyl chloride, poly(vinyl nitrate), substituted (butyryl, palmitic, capryloyl, lauric, myristic, and stearic acids, myristol, halogens, azide, or amines, poly(vinyl alcohol), carboxylated poly(vinyl alcohol), poly(vinyl chloride-co-vinyl acetate-co-vinyl alcohol), poly(vinyl acetate-co-acrylic acid), poly(vinyl alcohol-co-acrylic acid), poly(vinyl alcohol)-acrylamide, poly(vinyl alcohol)-salicylic acid, poly(vinyl methyl ketone), and mixtures thereof.

18. The device according to claim 15, wherein the oxidant is configured to polymerize molecules of monomers of the base polymer material.

19. The device according to claim 15, wherein said single active electrochromic material layer of polymer gel is configured to be in the second light-blocking state prior to any electrical potential being applied thereto.

\* \* \* \* \*

UNITED STATES PATENT AND TRADEMARK OFFICE
CERTIFICATE OF CORRECTION

| | |
|---|---|
| PATENT NO. | : 11,815,779 B2 |
| APPLICATION NO. | : 17/838443 |
| DATED | : November 14, 2023 |
| INVENTOR(S) | : Manoj Kumar Ram and Elias K. Stefanakos |

It is certified that error appears in the above-identified patent and that said Letters Patent is hereby corrected as shown below:

In the Claims

Column 9, Claim 7, Line 61, "poly gel material" should be --polymer gel material--.

Signed and Sealed this
Fourth Day of June, 2024

Katherine Kelly Vidal
*Director of the United States Patent and Trademark Office*